United States Patent
Matsuoka et al.

(10) Patent No.: US 6,191,227 B1
(45) Date of Patent: Feb. 20, 2001

(54) POLYETHYLENE RESIN, AND PIPES AND PIPE JOINTS USING SAME

(75) Inventors: Tohru Matsuoka; Kiyofumi Matsuoka; Fumiaki Naka; Kiyonobu Sato, all of Oita (JP)

(73) Assignee: Japan Polyolefins Co., Ltd., Tokyo (JP)

( * ) Notice: Under 35 U.S.C. 154(b), the term of this patent shall be extended for 0 days.

(21) Appl. No.: 08/875,845

(22) PCT Filed: Dec. 6, 1996

(86) PCT No.: PCT/JP96/03584

§ 371 Date: Aug. 6, 1997

§ 102(e) Date: Aug. 6, 1997

(87) PCT Pub. No.: WO97/20868

PCT Pub. Date: Jun. 12, 1997

(30) Foreign Application Priority Data

Dec. 7, 1995 (JP) .................................................. 7-318809

(51) Int. Cl.[7] .............................. C08F 10/02; C08L 23/06
(52) U.S. Cl. ........................... 525/240; 525/319; 525/324
(58) Field of Search .................................... 525/240, 319, 525/324; 526/352

(56) References Cited

U.S. PATENT DOCUMENTS

| | | | |
|---|---|---|---|
| 4,933,393 | * 6/1990 | Toyota et al. | 525/240 |
| 5,019,627 | * 5/1991 | Honma et al. | 525/240 |
| 5,189,106 | * 2/1993 | Morimoto et al. | 525/240 |
| 5,405,901 | * 4/1995 | Daniell et al. | 525/53 |
| 5,589,539 | * 12/1996 | Wagner et al. | 525/53 |

* cited by examiner

*Primary Examiner*—Jeffrey C. Mullis
(74) *Attorney, Agent, or Firm*—Dilworth & Barrese, LLP

(57) ABSTRACT

A polyethylene resin superior in both moldability and long-term physical properties and suitable for both pipe and pipe joint, the polyethylene resin having a density of 0.915 to 0.955 g·cm$^{-3}$, a melt flow rate of not more than 0.20 dg·min as measured at 190° C. and at a load of 2.16 kgf, a melt flow rate of 17.0 to 70.0 dg·min$^{-1}$ as measured at 190° C. and at a load of 21.6 kgf, a zero shear viscosity ($\eta_0$) of 200,000 to 2,000,000 Pa·s, a characteristic time constant ($\tau_0$) of 50 to 500 sec., and a ratio ($\tau_0/\eta_0$) of $1.0\times10^{-4}$ to $4.0\times10^{-4}$ Pa$^{-1}$, the zero shear viscosity ($\eta_0$) being obtained by approximating a dynamic melt viscosity ($\eta^*$, unit: Pa·s) with equation [1], the dynamic melt viscosity ($\eta^*$) being obtained by measurement using a rheometer at 190° C., at a parallel plate spacing of 1.5 mm, at a distortion of 10% to 15% and in the frequency ($\omega$) range of 100 to 0.01 rad·s$^{-1}$:

$$\eta^* = \frac{\eta_0}{1 + (\tau_0 \cdot \omega)^n} \quad [1]$$

where *n* is a parameter.

2 Claims, No Drawings

POLYETHYLENE RESIN, AND PIPES AND PIPE JOINTS USING SAME

BACKGROUND OF THE INVENTION

The present invention relates to a polyethylene resin suitable for both extrusion and injection molding and also suitable for providing pipes superior in long-term life, as well as pipes and pipe joints formed using the said resin.

Pipes formed by molding of polyethylene resins are widely in practical use. Recently, such pipes have also come to be used as water pipes and gas pipes. Since these pipes are laid under the ground and are used over an extremely long period after laying, they are required to have a high reliability such that deformation or breakage does not occur over such a long period. This high reliability is represented in terms of, for example, creep resistance which is represented by the time required until breaking of a material applied with a static load and fatigue length which is represented by the time until breaking of a material applied with a load periodically.

Further, since the pipes in question are laid while connecting one to another, it is necessary to use pipe joints. The pipe joints are formed by injection molding, so the resin used for the pipe joints is required to have not only a high fluidity but also a poor creep resistance and a high fatigue life.

Generally, the fluidity of a polyethylene resin can be improved by decreasing its average molecular weight, but a lower average molecular weight has a bad influence on the attainment of a long life.

For obtaining a resin which meets the requirements for pipes, there has been proposed, for example, a method in which ethylene polymers of different molecular weights are mixed together, for example, by two-stage polymerization, melt blending, or dry blending, to broader the molecular weight distribution. For example, however, the resin proposed in Japanese Patent Publication JP63-67811B is inferior in point of service life although it has high rigidity, and the resin proposed in Japanese Patent Laid Open JP8-134285A has high viscosity and thus poor in fluidity at molten state, so is unsatisfactory in point of moldability. Thus, a resin capable of fully satisfying both physical properties and moldability has heretofore been not obtained.

It is an object of the present invention to provide a polyethylene resin superior in all of creep resistance, fatigue life and fluidity and capable of being subjected to injection molding.

It is another object of the invention to provide pipes having the above-mentioned characteristics and pipe joints for use in combination with said pipes.

SUMMARY OF THE INVENTION

Having made intensive studies for achieving the above-mentioned objects, the inventors of the present invention found out that a polyethylene resin whose melt flow rates at different loads satisfy predetermined values and whose dynamic melt viscosity and frequency dispersion satisfy a predetermined relation is superior not only in extrudability and injection-moldability but also in creep resistance and fatigue life and exhibits excellent effects when used in molding for pipes and pipe joints, and as a result, the present invention has been completed.

Firstly, the-present invention resides in a polyethylene resin having a density of 0.915 to 0.955 g·cm$^{-3}$, a melt flow rate of lower than 0.20 dg·min$^{-1}$ as measured at 190° C. under a load of 2.16 kgf, a melt flow rate of 17.0 to 70.0 dg·min$^{-1}$ as measured at 190° C. under a load of 21.6 kgf, a zero shear viscosity ($\eta_0$) of 200,000 to 2,000,000 Pa·s, a characteristic time constant ($\tau_0$) of 50 to 500 s, and a ratio ($\tau_0/\eta_0$) in the range from $1.0\times10^{-4}$ to $4.0\times10^{-4}$, said zero shear viscosity ($\eta_0$) being obtained by approximating a dynamic melt viscosity ($\eta^*$, unit: Pa·s) with equation [1], said dynamic melt viscosity ($\eta^*$) being obtained by measurement using a rheometer at 190° C., at a parallel plate spacing of 1.5 mm, at a distortion of 10% to 15% and in the frequency ($\omega$) range of 100 to 0.01 rad·s$^{-1}$:

$$\eta^* = \frac{\eta_0}{1+(\tau_0 \cdot \omega)^n} \qquad [1]$$

Secondly, the present invention resides in a pipe obtained by extrusion of the aforesaid polyethylene resin.

Thirdly, the present invention resides in a pipe joint obtained by injection of the aforesaid polyethylene resin.

Fourthly, the present invention resides in a connected pipe obtained by connecting such extruded pipes as mentioned above with such injection-molded pipe joints as mentioned above.

DESCRIPTION OF THE PREFERRED EMBODIMENTS

The polyethylene resin of the present invention has a density in the range of 0.915 to 0.955 g·cm$^{-3}$, preferably 0.935 to 0.955 g·cm$^{-3}$. If the density is lower than 0.915 g·cm$^{-3}$, the resin is too soft for use as a pipe, and a density exceeding 0.955 g·cm$^{-3}$ will result in poor creep characteristics and fatigue life.

The polyethylene resin of the present invention is required to have a melt flow rate (hereinafter referred to simply as MFR$_{2.16}$) of lower than 0.20 dg·min$^{-1}$, preferably in the range of 0.02 to 0.20 dg·min$^{-1}$, as measured at 190° C. under a load of 2.16 kgf. If this melt flow rate exceeds 0.20 dg·min$^{-1}$, an insufficient creep resistance will result.

It is also required that the polyethylene resin of the present invention have a melt flow rate (hereinafter referred to as MFR$_{21.6}$) of 17.0 to 70.0 dg·min$^{-1}$, preferably 17.0 to 30.0 dg·min$^{-1}$, as measured at 190° C. under a load of 21.6 kgf. If this melt flow rate is less than 17.0 dg·min$^{-1}$, it is likely that the extrusion of a pipe will become difficult of the productivity will be markedly deteriorated. There also is a fear that the injection molding for a pipe joint may become difficult or the pipe joint after molding may be deformed.

In the polyethylene resin of the present invention, moreover, it is necessary that a dynamic melt viscosity ($\eta^*$, unit: Pa·s) and the frequency ($\omega$, unit; s$^{-1}$) satisfy a predetermined relation, the dynamic melt viscosity being obtained by measurement at 190° C., at a parallel plate spacing of 1.5 mm, at a distortion of 10% to 15%, and in the frequency ($\omega$) range of 100 to 0.01 s$^{-1}$.

More specifically, when the dynamic melt viscosity and the frequency are fully approximated with the foregoing equation [1], the zero shear viscosity $\eta_0$ is in the range of 200,000 to 2,000,000 Pa·s, preferably 350,000 to 1,000,000 Pa·s, the characteristic time constant ($\tau_0$) is in the range of 50 to 500 s, preferably 100 to 300 s, and the ratio ($\tau_0/\eta_0$) is in the range of $1.0\times10^{-4}$ to $4.0\times10^{-4}$ Pa$^{-1}$.

The $\eta_0$ and $\tau_0$ are obtained on the basis of readings on a rheometer using parallel plates. More specifically, a dynamic melt viscosity ($\eta^*$) is measured under the conditions of 190° C., a plate spacing of 1.5 mm, a distortion of 10% to 15% and a frequency range of 100 to 0.01 (unit; rad·s$^{-1}$), and the data obtained is approximated with equation [1]. This approximation affords the zero shear viscosity ($\eta_0$), characteristic time constant ($\tau_0$) and parameter (n). Regressive approximation to equation [1] can be calculated by using a suitable computer program of regression available commercially.

The $\tau_0$ is a parameter indicative of a relaxation time and n is a parameter indicative of a shear rate dependence in a high shear rate region.

The equation [1] is an empirical formula generally called "Equation of Cross" and is outlined, for example, in Glenn V. Gordon, Montgomery T. Shaw, "Computer Programs for Rheologists", Hanser Publishers.

The relation between the dynamic melt viscosity at 190° C. and the frequency can be obtained by using a commercially available device, e.g. RMS-800 rheometer (a product of Rheometrics Co.).

The parameter n in the equation represents stands for a shear rate dependence of melt viscosity in a high shear rate region.

By the phrase "fully approximated" as referred to herein is meant to approximate so that the square of the linear correction coefficient between the fitted curve approximated by the least squares method and the data points, i.e. the coefficient of determination $R^2$, corresponds to a value higher than 0.9992.

The $\eta_0$ is a parameter which stands for a melt viscosity in the complete absence of a shear stress and which is influenced by both weight average molecular weight and Z-average molecular weight. Generally, the higher this value, the longer the creep resistance and the higher the fatigue life.

In the polyethylene resin of the present invention, if $\eta_0$ is less than 200,000 Pa·s, the creep resistance will be insufficient, and a $\eta_0$ value exceeding 2,000,000 Pa·s will result in deteriorated extrudability and injection-moldability.

The characteristic time constant is ($\tau_0$) is indicative of being difficult to deform in a melted state, and in the polyethylene resin of the present invention the $\tau_0$ is in the range of 50 to 500 s, preferably 100 to 300 s. If the $\tau_0$ is smaller than 50 s, the creep resistance and fatigue life will no longer be in well balance with extrudability and injection-moldability. As a $\tau_0$ value exceeding 500 s, it is difficult to produce such a resin on a practical scale.

The $\tau_0$ to $\eta_0$ ratio ($\tau_0/\eta_0$) is a parameter indicating elasticity of the molten resin. The higher the ratio, the higher the elasticity. Particularly a large value is exhibited in a molecular structure having a long-chain branch. Such a molecular structure is not desirable in the polyethylene resin of the present invention because the above structure may result in insufficient creep resistance and fatigue life and deteriorated smoothness of the surface texture of molded products. In this sense, the $\tau_0/\eta_0$ ratio in the polyethylene resin of the invention is in the range of $1.0 \times 10^{-4}$ to $4.0 \times 10^{-4}$ Pa$^{-1}$. In the case where the $\tau_0/\eta_0$ ratio exceeds $4.0 \times 10^{-4}$ Pa$^{-1}$, it is presumed that the resin concerned will be of a molecular structure having a long-chain branch, resulting in deterioration of the long-term performance. Further, a $\tau_0/\eta_0$ ratio lower than $1.0 \times 10^{-4}$ Pa$^{-1}$ will lead to unsatisfactory moldability.

The polyethylene resin of the present invention satisfies all of the conditions defined above. Such a polyethylene resin possesses a special molecular weight distribution, and by meeting the above conditions there can be attained a sufficient creep resistance and a long fatigue life without impairment of moldability.

By virtue of such characteristics the polyethylene resin of the present invention is best suited for use in the production of pipes, especially water and gas pipes which are buried into the ground. However, it goes without saying that the polyethylene resin of the present invention is also applicable to other uses than the pipe use.

The polyethylene resin of the present invention is prepared by the homopolymerization of ethylene or by copolymerization of ethylene and α-olefins such as propylene, 1-butene, 1-pentene, 1-hexene, 1-octene and 4-methyl-1-pentene. How to prepare the polyethylene resin is not specially limited if only the resulting resin meets the foregoing conditions. For example, there may be adopted a single-stage polymerization, a multistage polymerization of two or more components having different molecular weights, or a method involving post-blending of components prepared by polymerization. Taking into account a complicated operation and much time required for attaining an intimate blending, the multistage polymerization of two or more components different in molecular weight is most preferred.

One of the most suitable methods is as disclosed in Japanese Patent Laid Open No. JP58-225105A in which high and low molecular weight components are continuously subjected to a suspension polymerization in first and second reactors, respectively, of pipe loop reactors using a magnesium chloride-supported type Ziegler catalyst. In this case, if the weight average molecular weight of the high molecular weight component is set in the range of 700,000 to 2,000,000, that of the low molecular weight component in the range of 20,000 to 100,000, the ratio of the former to the latter is set in the range of 10/90 to 35/65 and thus the proportion of the high molecular weight component is set smaller, and the molecular weight of the high molecular weight component is made relatively high, then there will be obtained a polyethylene resin which satisfies the foregoing specific conditions.

In the polyethylene resin of the present invention there may be incorporated, for example, other thermoplastic resins, additives pigments and fillers according to for what purpose the resin is to be used and in the scope not impairing the characteristics of the resin specified in the invention.

The pipe according to the present invention, which is produced by extrusion of the resin specified above, has a sufficient creep resistance and exhibits little deterioration in its resistance even against a long-term fatigue; besides, its characteristics permits the use thereof suitably as a water pipe such as a water feed pipe or a water distributing pipe or as a gas pipe. Where the pipe in question is to be used as such a water pipe or a gas pipe, it is required to have a bore diameter of about 50 to 500 mm, a wall thickness of about 2 to 50 mm, and be employable for 50 years or more at a hoop stress of 10 Mpa or so at 20° C.

The pipe joint according to the present invention, which is produced by injection molding of the resin specified above, is used for coupling the pipes of the invention. The coupling is effected by embedding a wire heater in the interior of the pipe joint, followed by fitting the pipes therein and subsequent fusion of the joint, or by heating the surface to be fused.

The pipe joint is required to have not only injection-moldability but also substantially the same long life as the pipe.

EXAMPLES

The present invention will be described below concretely by way of examples and comparative examples. However, the present invention is not limited to the following examples.

Example 1

[Preparation of Sample]

Two-stage polymerization reactors comprising two pipe loop reactors connected in series, the first reactor having a capacity of 145 liters and the second reactor 290 liters, were thoroughly purged with nitrogen. Next, isobutane was fed to fill the interior of the reactors with isobutane. Thereafter, triisobutylaluminum was fed so that its concentration in the first reactor was 1.0 mmol·liter$^{-1}$ and the temperature of the first reactor and that of the second reactor were raised to 80° C. and 90° C., respectively, with stirring. Then, ethylene was fed so that its concentrations in the first and second reactors were 1.0 wt % and 2.6 wt %, respectively, hydrogen was fed so that its concentrations in the first and second reactors were 0.1×10$^{-3}$ wt % and 0.027 wt %, respectively, and 1-hexene was fed so that its concentration in the first reactor was 6.4 wt %. A slurry in hexane of a solid catalyst component which had been prepared in accordance with the sold catalyst component preparing process described in Example 1 of Japanese Patent Laid Open JP58-225105A

(A) Preparation of Comilled product (1)

Into a one liter pot (a vessel for milling) containing about 70 pieces of porcelain balls having a diameter of 10 mm therein were added 20 g (17.5 mmol) of commercially available magnesium ethylate (average particulate diameter of 860 microns), 1.66 g (12.5 mmol) of particulate aluminum trichloride and 2.72 g (10 mmol) of dihenyldiethoxysilane under nitrogen atmosphere.

They were comilled for 3 hours by using a vibrating ball mill at the conditions of a magnitude of 6 mm and a frequency of 30 Hz/minute. After the comilling, the contents were separated from the porcelain balls under nitrogen atmosphere. The obtained comilled product (hereinafter referred to "comilled product (1)") was weighed and confirmed that the recovery was 85.3% based on the feed weight.

(B) Preparation of Solid Catalyst Component (A)

Into a 200 ml three-necked flask were added 5 g of the obtained comilled product (1) and 20 ml of n-heptan. 10.4 ml of titanium tetrachloride were added dropwise thereto at a room temperature while stirring and then the temperature of the reaction system was increased up to 90° C. and the reaction system was stirred for 90 minutes. Then, the reaction system was cooled, the supernatant liquid was taken off and n-hexane was added. The above was repeated three times. The pale yellow solid thus obtained was dried at 50° C. for 6 hours under reduced pressure. As a result, 7.2 g of a solid product (hereinafter referred to as "solid catalyst component (A)") were obtained. The elemental analyses of the solid catalyst component were conducted. The contents of the respective elements were as follows:

magnesium atom 11.2 weight %;

aluminum atom 0.7 weight %;

silicon atom 0.2 weight %; and chloride atom 54 weight %.

The slurry was fed continuously in such a manner that the feed rate of the solid catalyst component was 2.0 g·h$^{-1}$, to start polymerization. While isobutane was fed continuously to the first reactor at a rate of 51.5 kg·h$^{-1}$ and also to the second reactor at a rate of 34.0 kg·h$^{-1}$, the polyethylene produced was discharged at a rate of 20 kg·h$^{-1}$, and the concentration of triisobutylaluminum in the first reaction, as well as the ethylene and hydrogen concentrations and temperatures in the first and second reactors, were held as mentioned above.

The pressure of the discharged isobutane slurry of polyethylene was released to evaporate isobutane, followed by drying by means of a conveyor drier at 80° C. to afford a powder. The powder was pelletized using a corotating, intermeshed, twin-screw extruder (L/D=32) of 37 mm in diameter to give a sample.

The weight average molecular weight of the high molecular weight component in the first reactor was about 770,000, the density thereof was 0.917 g·cm$^{-3}$, and an estimated weight average molecular weight of the low molecular weight component in the second reactor was about 56,000, an estimated density thereof was 0.957 g·cm$^{-3}$. Physical properties of the polymer are as shown in Table 1.

[Measurement of Physical Properties]

In accordance with JIS K 7210, melt flow rates were measured at 190° C. and at a load of 2.16 kgf (Test Condition 4 in Table 1 of JIS K 7210) and also at 190° C. and at a load of 21.60 kgf (Test Condition 7 in Table 1 of JIS K 7210).

By measurement conducted at 190° C., at a parallel plate spacing of 1.5 mm, at a distortion of 10% to 15% and in the frequency ($\omega$) range of 100 to 0.01 s$^{-1}$, using an RMS-800 rheometer (a product of Rheometrics Co.), there was obtained a relation between a dynamic melt viscosity ($\eta^*$, unit: Pa·s) and frequency ($\omega$, unit: s$^{-1}$). Data were obtained five points at every decade of the frequency range. The data thus obtained were fully approximated with equation [1]. The results obtained are as shown in Table 1.

Using a UH-7-32DN type pipe extruder (70 mm indiameter)(a product of Hitachi Zosen Sangyo Co.), the sample was extruded into a pipe of nominal diameter 50 which is defined by JIS K 6762. Then, in accordance with paragraph 3.1 of an Annex to JIS K 6774, the pipe was cut into a width of 5.9±0.2 mm. Using a razor blade, the thus-cut pipe piece was notched at a depth of 1 mm over the whole circumference to obtain a test piece.

As to extrudability, it was evaluated on the basis of both extruder output and motor current. The evaluation was ranked as follows: good⊚, a slightly good ○, a slightly bad △, bad x.

Then, a tensile load was applied to the test piece by means of an immersion type constant load tensile tester CR-20-50P (a product of Yonekura Seisakusho) to check the creep resistance, the time required until the test piece was cut at the notched portion (whole circumference notched tensile creep test defined in Annex 1 to JIS K 6774). Likewise, a tensile load was applied to the test piece in terms of square waves of 0.5 Hv at 80° C. by means of a servo-pulser EHF-EB08 (a product of Shimadzu Seisakusho, Ltd.), and the time required until cutting of the test piece was measured as fatigue life (whole circumference notched tensile fatigue test defined in Annex 2 to JIS K 6774). For both creep resistance and fatigue life, the measurements were conducted at several points and at different loads. The loads were each divided by the sectional area of the cut surface to obtain a stress. The results obtained are all shown in Table 1. Test pieces having a sufficient creep resistance even under high stresses are superior, while those which exhibit an abrupt drop of stress with the lapse of resistance time are inferior.

As to the fatigue life, those having a long fatigue life even under high stresses are superior.

The sample was injection-molded using an MIII Sycap 480/150 injection molding machine (a product of Sumitomo Shipbuilding & Machinery Co., Ltd.) and spiral flow was evaluated under the conditions of nozzle temperature 230° C., mold temperature 45° C. and injection pressure 750 kgf·cm$^{-2}$.

The results of the above various tests are set forth in Table 1. In Example 1, the larger the numerical value of spiral flow, the better the flow property and hence the easier the injection molding, especially, the more suitable for pipe joint molding. The results obtained in Example 1 are superior in all of extrudability, creep resistance, fatigue life and spiral flow.

Example 2

Polymerization was performed in the same way as in Example 1 except that molecular weight, density and production ratio were changed in the first and second reactors. The results obtained are as shown in Table 1. Physical property tests were also conducted in the same manner as in Example 1 and the results obtained are set forth in the same table. There were obtained good results in all of extrudability, creep resistance, fatigue life and spiral flow.

Example 3

Using the same catalyst as that used in Example 1, high and low molecular weight components were separately prepared and blended. At this time, the following operations were performed in order to attain intimate blending. First, 60% of the high molecular weight component and 40% of the low molecular weight component were blended and the pelletized using a corotating, intermeshed, twin-screw extruder (L/D=32) of 37 mm in diameter to afford a primary blend. Next, the primary blend was melt-kneaded by the same extruder while only the low molecular weight component was side-fed additionally from another feed port to yield a secondary blend. At this time, the feed rate ratio was set at 29.3 low molecular weight component relative to 70.7 primary blend. Further, for the secondary blend, the low molecular weight component was side-fed additionally at just the same feed rate ratio using the same extruder to afford a final blend. The ratio of the high to the low molecular weight component in the final blend was 30/70 wt %. Physical property tests of the final blend were conducted in the same manner as in Example 1 and the results obtained are set forth in Table 1. There were obtained good results in all of extrudability, creep resistance, fatigue life and spiral flow.

Comparative Example 1

A multistage polymerization was carried out in the same way as in Example 1 except that molecular weight, density and production ratio were changed in the first and second reactors. The results obtained are as shown in Table 2. Physical property tests were also conducted in the same manner as in Example 1. The results obtained are set forth in Table 2, from which it is seen that $\eta_0$ and $\tau_0$ are low and that both creep resistance and fatigue life are inferior.

Comparative Example 2

A multistage polymerization was carried out in the same way as in Example 1 except that molecular weight, density and production ratio were changed in the first and second reactors. The results obtained are as shown in Table 2. Physical property tests were also conducted in the same manner as in Example 1 and there were obtained such results as set forth in Table 2. A look at Table 2 shows that $MFR_{21.6}$ and $\tau_0$ are low and that creep resistance, fatigue life and injection-moldability are inferior, with extrudability being also somewhat poor.

Comparative Example 3

A multistage polymerization was carried out in the same way as in Example 1 except that molecular weight, density and production ratio were changed in the first and second reactors. The results obtained are as shown in Table 2. Physical property tests were also conducted in the same manner as in Example 1 and there were obtained such results as set forth in Table 2. Reference to the same Table shows that $MFR_{21.6}$ is low and that creep resistance, fatigue life and injection-moldability and extrudability are inferior.

Comparative Example 4

A multistage polymerization was carried out in the same way as in Example 1 except that comonomer, molecular weight, density and production ratio were changed in the first and second reactors. The results obtained are as shown in Table 2. Physical property tests were also conducted in the same manner as in Example 1 and there were obtained such results as set forth in Table 2, from which it is seen that $MFR_{21.6}$ and $\tau_0$ are low and that creep resistance, fatigue life are inferior, with extrudability being also a little poor.

Comparative Example 5 and 6

Using commercially available resins for pipes, measurements were conducted in the same way as in Example 1, the results of which are set out in Table 2. A look at the same table shows that Comparative Example 5, $MFR_{21.6}$, $\eta_0$ and $\tau_0$ are low, fatigue life, injection-moldability and extrudability are poor, and that in Comparative Example 6, $\tau_0/\eta_0$ ratio is low, creep resistance and fatigue life are inferior.

Of the data described in the above tables, the values of MFR are actually measured values, while the other data are calculated values obtained by charting frequency and measured values of dynamic melt viscosity, then approximating them with equation [1] in accordance with a method of least squares, and using the results of calculation obtained. In the tables, "e-04" means "x10$^{-4}$".

TABLE 1

|  |  | Example 1 | Example 2 | Example 3 |
|---|---|---|---|---|
| Comonomer |  | Hexene-1 | Hexene-1 | Hexene-1 |
| High Molecular Weight Component |  |  |  |  |
| Mw |  | 7.7e+5 | 7.9e+5 | 1.0e+6 |
| Density | g · cm$^{-3}$ | 0.917 | 0.917 | 0.906 |
| Blending Ratio wt % |  | 30 | 30 | 30 |
| Low Molecular Weight Component |  |  |  |  |
| Mw |  | (5.6e+4) | (3.5e+5) | 4.5e+4 |
| Density | g · cm$^{-3}$ | (0.957) | (0.961) | 0.968 |
| Blending Ratio wt % |  | 70 | 70 | 70 |
| All Resin Component |  |  |  |  |
| $MFR_{2.16}$ | dg · min$^{-1}$ | 0.12 | 0.14 | 0.06 |
| $MFR_{21.6}$ | dg · min$^{-1}$ | 19.5 | 19.5 | 17.0 |
| Density | g · cm$^{-3}$ | 0.945 | 0.947 | 0.948 |
| $\eta_0$ | Pa · s | 4.5e+5 | 5.42e+5 | 8.49e+5 |
| $\tau_0$ | s | 151 | 191 | 126 |
| n |  | 0.54 | 0.55 | 0.60 |
| $\tau_0/\theta_0$ | Pa$^{-1}$ | 3.35e-4 | 3.52e-4 | 1.48e-4 |
| Creep Life |  |  |  |  |
| Stress | 10 MPa Hr | 1 | 3 | 5 |
|  | 9 MPa Hr | 30 | 70 | 100 |
|  | 8 MPa Hr | 1,700 | 2,800 | 3,300 |
| Fatigue Strength |  |  |  |  |
| Stress | 10 MPa Hr | 33 | 12 | 10 |
|  | 9 MPa Hr | 55 | 23 | 20 |
|  | 8 MPa Hr | 93 | 50 | 50 |

TABLE 1-continued

|  |  | Example 1 | Example 2 | Example 3 |
|---|---|---|---|---|
| Spiral Flow |  |  |  |  |
| Thickness | 1.0 mm cm | 4.5 | 4.3 | 4.1 |
|  | 3.0 mm cm | 21.5 | 20.3 | 20.0 |
| Extrudability |  | ◎ | ◎ | ◎ |

( )Parenthesized values are estimated values.

TABLE 2

| Comparative Example | | 1 | 2 | 3 | 4 | 5 | 6 |
|---|---|---|---|---|---|---|---|
| Comonomer | | Hexene-1 | Hexene-1 | Hexene-1 | Butene-1 | *A | *B |
| High Molecular Weight Component | | | | | | | |
| Mw | | 6.5e+5 | 4.8e+5 | 6.1e+5 | 7.1e+5 | — | — |
| Density | g·cm$^{-3}$ | 0.927 | 0.928 | 0.925 | 0.920 | — | — |
| Blending Ratio wt % | | 30 | 46 | 50 | 39 | — | — |
| Low Molecular Weight Component | | | | | | | |
| Mw | | (6.6e+4) | (3.2e+5) | (2.5e+4) | (3.3e+4) | — | — |
| Density | g·cm$^{-3}$ | (0.958) | (0.968) | 0.975 | (0.968) | — | — |
| Blending Ratio wt % | | 70 | 54 | 50 | 61 | — | — |
| All Resin Component | | | | | | | |
| MFR$_{2.16}$ | dg·min$^{-1}$ | 0.22 | 0.13 | 0.045 | 0.093 | 0.12 | 0.14 |
| MFR$_{21.6}$ | dg·min$^{-1}$ | 21.5 | 13.7 | 8.5 | 13.2 | 10.1 | 25.5 |
| Density | g·cm$^{-3}$ | 0.948 | 0.950 | 0.950 | 0.950 | 0.948 | 0.947 |
| $\eta_0$ | Pa·s | 1.50e+5 | 2.20e+5 | 6.1e+5 | 3.22e+5 | 1.50e+5 | 2.80e+5 |
| $\tau_0$ | s | 42.4 | 48.0 | 82.0 | 49.7 | 12.0 | 121 |
| n | | 0.50 | 0.49 | 0.54 | 0.54 | 0.52 | 0.50 |
| $\tau_0/\theta_0$ | Pa$^{-1}$ | 2.82e-4 | 2.18e-4 | 1.36e-4 | 1.54e-4 | 7.87e-5 | 4.32e-4 |
| Creep Life | | | | | | | |
| Stress | 10 MPa Hr | 5 | 7 | 2 | 7 | 2 | 0.4 |
|  | 9 MPa Hr | 40 | 130 | 90 | 80 | 80 | 6 |
|  | 8 MPa Hr | 65 | 210 | 900 | 130 | 1,600 | 120 |
| Fatigue Strength | | | | | | | |
| Stress | 10 MPa Hr | 2.3 | 7.0 | 8.5 | 4.5 | 5.0 | 6.0 |
|  | 9 MPa Hr | 4.5 | 10 | 15 | 7.2 | 8.1 | 9.0 |
|  | 8 MPa Hr | 9.0 | 20 | 21 | 11 | 13 | 13 |
| Spiral Flow | | | | | | | |
| Thickness | 1.0 mm cm | 4.0 | 3.8 | 3.5 | 3.9 | 3.5 | 4.8 |
|  | 3.0 mm cm | 20.0 | 17.5 | 16.2 | 21.2 | 18.0 | 24.2 |
| Extrudability | | ○ | Δ | X | Δ | X | ◎ |

*Commercial Product
Parenthesized values are estimated values.

From the above results it is seen that the polyethylene resin of the present invention can be formed into water and gas pipes of a longer life as compared with the conventional polyethylene resins for pipes and can also be formed into pipe joints by virtue of its excellent injection-moldability. Thus, with the polyethylene resin of the same characteristics, it is possible to produce both pipe body and pipe joint to be combined with the pipe body. Consequently, it becomes possible to improve the addition layability of pipes and further prolong the life of the whole of buried, combined pipes.

What is claimed is:

1. A pipe formed by extrusion of a polyethylene resin superior in both moldability and long-term physical properties and suitable for both pipe and pipe joint, said polyethylene resin having a density of 0.915 to 0.955 g·cm$^{-3}$, a melt flow rate of not more than 0.20 dg·min$^{-1}$ as measured at 190° C. and at a load of 2.16 kgf, a melt flow rate of 17.0 to 70.0 dg·min$^{-1}$ as measured at 190° C. and at a load of 21.6 kgf, a zero shear viscosity ($\eta_0$) of 200,000 to 2,000,000 Pa·s, a characteristic time constant ($\tau_0$) of 50 to 500 sec., and a ratio ($\tau_0/\eta_0$) of $1.0 \times 10^{-4}$ to $4.0 \times 10^{-4}$ Pa$^{-1}$, said zero shear viscosity ($\eta_0$) being obtained by approximating a dynamic melt viscosity ($\eta^*$, unit: Pa·s) with equation (1), said dynamic melt viscosity ($\eta^*$) being obtained by measurement using a rheometer at 190° C. at a parallel plate spacing of 1.5 mm, at a distortion of 10% to 15% and in the frequency ($\omega$) range of 100 to 0.01 rad·s$^{-1}$:

$$\eta^* = \frac{\eta_o}{1 + (\tau_o \cdot \omega)^n} \quad (1)$$

where n is a shear rate dependence parameter in a high shear rate region.

2. A combination of the pipe of claim 1 and a pipe joint formed by injection molding of a polyethylene resin superior in both moldability and long-term physical properties and suitable for both pipe and pipe joint, said polyethylene resin having a density of 0.915 to 0.955 g·cm$^{-3}$, a melt flow rate of not more than 0.20 dg·min$^{-1}$ as measured at 190° C. and at a load of 2.16 kgf, a melt flow rate of 17.0 to 70.0 dg·min$^{-1}$ as measured at 190° C. and at a load of 21.6 kgf, a zero shear viscosity ($\eta_0$) of 200,000 to 2,000,000 Pa·s, a characteristic time constant ($\tau_0$) of 50 to 500 sec., and a ratio ($\tau_0/\eta_0$) of $1.0\times10^{-4}$ to $4.0\times10^{-4}$ $Pa^{-1}$, said zero shear viscosity ($\eta_0$) being obtained by approximating a dynamic melt viscosity ($\eta^*$, unit: Pa·s) with equation (1), said dynamic melt viscosity ($\eta^*$) being obtained by measurement using a rheometer at 190° C. at a parallel plate spacing of 1.5 mm, at a distortion of 10% to 15% and in the frequency ($\omega$) range of 100 to 0.01 rad·$s^{-1}$:

$$\eta^* = \frac{\eta_o}{1+(\tau_o \cdot \omega)^n} \quad (1)$$

where n is a shear rate dependence parameter in a high shear rate region.

* * * * *